No. 668,726. Patented Feb. 26, 1901.
F. P. ZIEGLER.
HEATER.
(Application filed Dec. 3, 1900.)
(No Model.)
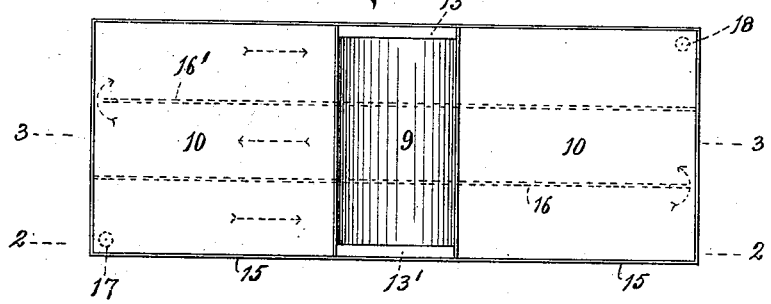
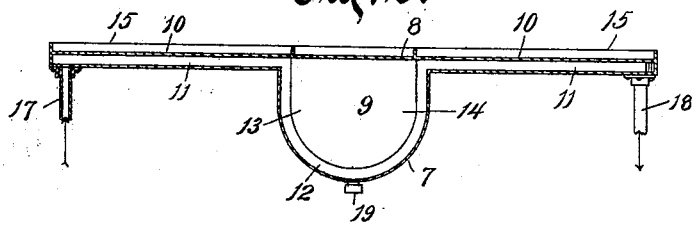
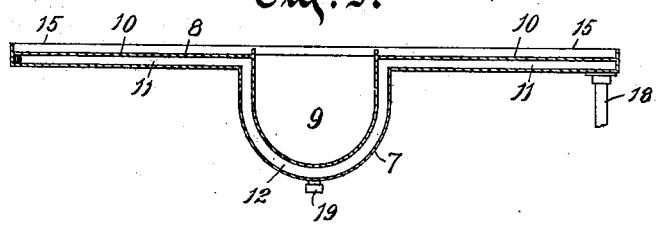
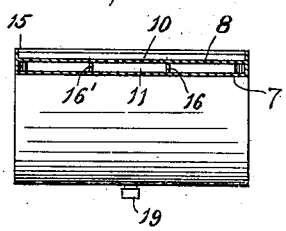
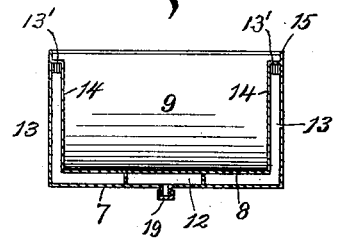
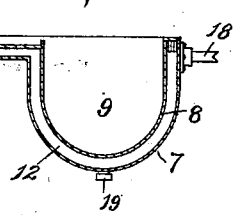
Witnesses.
C. N. Kenny.
Anna V. Faust.
Inventor.
Frank P. Ziegler.
By Benedich & Morsell
Attorneys.

UNITED STATES PATENT OFFICE.

FRANK P. ZIEGLER, OF MILWAUKEE, WISCONSIN.

HEATER.

SPECIFICATION forming part of Letters Patent No. 668,726, dated February 26, 1901.

Application filed December 3, 1900. Serial No. 38,400. (No model.)

*To all whom it may concern:*

Be it known that I, FRANK P. ZIEGLER, residing at Milwaukee, in the county of Milwaukee and State of Wisconsin, have invented a new and useful Improvement in Heaters, of which the following is a description, reference being had to the accompanying drawings, which are a part of this specification.

My invention has relation to improvements in heaters more especially intended for heating liquid or semiliquid confections, such as liquid chocolates, so as to prevent coagulation or hardening of the liquid, especially where liquid is to be used as an outer coating for a confection.

Heretofore it has been customary to place the liquid chocolate on a slab of suitable material and to perform the coating operation on this slab. Various means for keeping the slab in a heated condition have been resorted to; but none of them have been attended with entirely satisfactory results, owing to the fact that it has been found difficult to apply heat evenly over the surface of the slab, and consequently the liquid on the portions of the slab where there is a diminished heat soon coagulates, clots, or thickens. In fact, this hardening of the liquid on the slab after some little time becomes so great that the hardened crust must be removed, and hence considerable time is necessarily wasted by reason thereof.

It is the primary object of my invention to provide a simple, convenient, and economical device which shall combine in one structure a convenient receptacle for containing the liquid confection and also a pan on which the work of coating the candy with the liquid is performed, in connection with means for conveniently heating not only the liquid contained in the receptacle, but also that which as the work progresses is removed from the receptacle and placed in the pan.

With the above primary object in view the invention consists of the devices and parts or their equivalents, as hereinafter more fully pointed out.

In the drawings, Figure 1 is a plan view of the invention. Fig. 2 is a longitudinal section on the line 2 2 of Fig. 1. Fig. 3 is a longitudinal sectional view on the line 3 3 of Fig. 1. Fig. 4 is a cross-section through one of the pans. Fig. 5 is a cross-section through the receptacle, and Fig. 6 shows a longitudinal section of a modified form of construction.

The entire device consists of two sheets or linings of metal or other desirable material—that is, an outer sheet 7 and an inner sheet 8—which are closed at their ends and sides. Both the outer and inner sheets are bent downwardly to form a receptacle 9, while the portions projecting from opposite side edges of the receptacle are in a horizontal plane and form what I term the "pans" 10 10. These inner and outer sheets are arranged a suitable distance apart to form a space therebetween, the spaces of the pans being indicated by the numerals 11 11 and the space of the receptacle by the numeral 12. The several spaces are all in communication with each other, as will be clearly seen from Figs. 2 and 3. I also preferably provide spaces 13 13 at opposite ends of the receptacle, said spaces being formed by providing upwardly-extending end pieces 14 14 to that portion of the inner lining 8 which is bent downwardly to constitute the inner lining of the receptacle, the said end pieces being a slight distance removed from the corresponding end pieces of the outer lining. The upper ends of these end pieces 14 are bent outwardly and extended to and connected with the end pieces of the outer lining, as clearly shown in Fig. 5, so that the upper ends of the spaces 13 are closed against the escape of the heat therefrom, as shown at 13'. These end pieces 14 for the receptacle are preferably provided so that the heat in the receptacle may be evenly distributed not only on opposite sides and the bottom of the receptacle, but also at said opposite ends. The liquid of course is in the receptacle a considerable time, and consequently the end spaces are very desirable in order to prevent any hardening of the liquid at the opposite ends of the receptacle.

Extending upwardly from the edges of the pans are flanges 15, forming rectangular rims for the pans to prevent the escape of the liquid deposited in said pans.

The spaces 11 11 and 12 are preferably subdivided into a series of passages by means of longitudinal partitions, so as to insure the heat passing over all portions of said spaces before final discharge. Any desired number of these partitions may be employed, so as to subdivide into any desired number of spaces; but I prefer to employ two of said partitions (designated, respectively, by the numerals 16 16') to thereby form three of the passages. The partition 16 is joined to one end of one of the pans and is then extended longitudinally the length of said pan and across the receptacle and for substantially the length of the opposite pan, but terminating just short of the end of said pan. The other partition is joined to this latter pan and extends longitudinally thereof and thence across the receptacle and for substantially the length of the opposite pan, but terminating just short of the end of said opposite pan. From this arrangement it will be evident that the heat will take the course clearly indicated by the arrows in Fig. 1.

The numeral 17 indicates the inlet-pipe for the heating agent, (preferably water,) and 18 the outlet-pipe, the latter being located in one of the outer passages and at the end thereof, so that the heating medium must thereby complete its full course before finally passing out of the device.

A drain-nozzle 19 may be advantageously employed to drain off the water in case repairs are to be made.

In the use of my invention a quantity of the liquid confection is placed in the receptacle and the heated water or other heat permitted to pass through the several spaces hereinbefore referred to, thereby keeping the device at the proper temperature to prevent hardening of the liquid. The operators are in a position at the ends of the pans, and each operator takes a certain amount of the liquid from the receptacle and places it in the pan, and the molded cream or other candy is then coated with the chocolate or other liquid.

It will be evident by the use of my invention that the liquid is not only prevented from hardening during the process of coating the candy, but, furthermore, many other desirable advantages are gained. For instance, chocolate can be worked which is much thicker than could heretofore be successfully worked, whereby a saving is effected in cocoa butter or the fatty substances which would otherwise have to be added. A saving in the chocolate liquid is also effected, as the coating is of an even or uniform thickness, whereas under the old plan the chocolate necessarily becomes thicker and thicker as the work progresses. Again, my invention saves the time which has heretofore been necessarily employed in scraping off the thickened or hardened chocolate from the slab.

The modified form of construction illustrated in Fig. 6 differs from the construction shown in Figs. 1, 2, and 3 in that one of the end pans is omitted, thereby adapting the Fig. 6 form for only one operator. The outlet-pipe in this Fig. 6 form necessarily extends from the receptacle. The Figs. 1 to 3 form is the preferable form, as convenience is thereby greatly subserved; but I illustrate the Fig. 6 form to clearly show that I consider such construction within the spirit and scope of my invention.

What I claim as my invention is—

1. In a heater, the combination of a receptacle having a space therebeneath, a pan extending from the receptacle, said pan having a space therebeneath in communication with the space of the receptacle, and means for admitting a heating agent into the communicating spaces and for permitting the same to pass thereout.

2. In a heater, the combination with a receptacle having a space therebeneath, and at opposite ends thereof, a pan extending from the receptacle, said pan having a space therebeneath, in communication with the spaces of the receptacle, and means for admitting a heating agent into the communicating spaces and for permitting the same to pass thereout.

3. In a heater, the combination of a receptacle having a space therebeneath, a pan extending from the receptacle, said pan having a space therebeneath in communication with the space of the receptacle, a longitudinal partition or partitions extending longitudinally of the communicating spaces and dividing said spaces into a plurality of passages, and means for admitting a heating agent into one of the passages, and for permitting the same to pass out of another of said passages.

4. In a heater, the combination of a receptacle having a space therebeneath, pans extending from opposite sides of the receptacle, said pans having spaces therebeneath in communication with the space of the receptacle, and means for admitting a heating agent into the communicating spaces, and for permitting the same to pass thereout.

5. In a heater, the combination of a receptacle having a space therebeneath, pans extending from opposite sides of the receptacle, said pans having spaces therebeneath in communication with the spaces of the receptacle, a partition or partitions extending longitudinally of the communicating spaces and dividing said spaces into a plurality of longitudinal passages, and means for admitting a heating agent into one of the passages, and for permitting the same to pass out of another of said passages.

In testimony whereof I affix my signature in presence of two witnesses.

FRANK P. ZIEGLER.

Witnesses:
A. L. MORSELL,
ANNA V. FAUST.